(12) United States Patent
Graham

(10) Patent No.: US 7,343,435 B2
(45) Date of Patent: Mar. 11, 2008

(54) STREAM BASED COMPRESSED FILE DOWNLOAD WITH INTERRUPTION RECOVERY

(75) Inventor: Aaron Thomas Graham, Indianapolis, IN (US)

(73) Assignee: Digital Networks North America, Inc., Santa Clara, CA (US)

( * ) Notice: Subject to any disclaimer, the term of this patent is extended or adjusted under 35 U.S.C. 154(b) by 473 days.

(21) Appl. No.: 10/705,084

(22) Filed: Nov. 10, 2003

(65) Prior Publication Data

US 2005/0102561 A1 May 12, 2005

(51) Int. Cl.
G06F 15/16 (2006.01)
G06F 15/177 (2006.01)

(52) U.S. Cl. ............... 710/62; 710/63; 710/64; 714/1; 714/748; 714/819; 709/221; 709/224

(58) Field of Classification Search ............ 710/62–64; 714/1, 748, 819
See application file for complete search history.

(56) References Cited

U.S. PATENT DOCUMENTS

| 6,460,163 | B1 | 10/2002 | Bowman ............... 714/819 |
| 6,928,468 | B2* | 8/2005 | Leermakers ............ 714/748 |
| 2004/0054953 | A1* | 3/2004 | Mitchell et al. ......... 714/748 |

* cited by examiner

*Primary Examiner*—Tammara Peyton
(74) *Attorney, Agent, or Firm*—McDonnell Boehnen Hulbert & Berghoff LLP

(57) ABSTRACT

A system and method are provided for storing and using recovery state information during a data stream transfer, such as a download. During the download of compressed, archived data, the system tracks the position of the last file boundary and the position of the last compression block boundary before the last file boundary, and the system stores this information as a recovery state. If the download is interrupted, the system uses the recovery state information to resume the download at an efficient location in the data stream.

14 Claims, 4 Drawing Sheets

STREAM BASED COMPRESSED FILE DOWNLOAD WITH INTERRUPTION RECOVERY

BACKGROUND

1. The Structure of Compressed Archived Files

Electronic data files are often downloaded in an archived and compressed format. That is, one or more files are first combined together into a single file called an "archive." The archive is then compressed into a smaller, compressed file. The compression of an archive file is more effective (i.e., it results in a smaller amount of data) than the individual compression of unarchived files.

Compressed data is, in general, "sequential access" data. This means that it is not possible to select a random position in the compressed data and to uncompress and make use of the information contained at that location. To make use of the data at a random position in the data, it is necessary to read the data from the beginning. If a compressed file is particularly large, it is often compressed in units called "blocks." The compressed file is sequential access with respect to the blocks, but a computer can begin reading at the beginning of any one of the blocks. This is useful for error recovery: if a compressed file is partly damaged, any undamaged blocks are still readable.

Like compressed files, archive files also store data in blocks. Each file in the archive starts at the beginning of a new block, but the file may take up several blocks. In practice, each archived file is stored together with a "header" that contains information about the file, such as the name of the file and when the file was created. The header is usually stored at the beginning of the file, at the start of an archive block.

Structuring archive files in blocks simplifies processing when files are removed from the archive. By starting new files at the beginning of a block, de-archiving software does not need to look for the start of a new file in the middle of a block.

The structure of a conventional compressed archive is illustrated in FIG. 1. Data files 10, 12, and 14 are combined into an archive file 16. The archive file 16 is in turn compressed to a compressed file 18.

The archive file 16 is divided into archive blocks, such as archive blocks 20 and 22. (Archive blocks are delineated in FIG. 1 with dotted lines.) File boundaries 24 and 26 align with the beginning of archive blocks. (File boundaries are illustrated by solid bolded lines in FIG. 1.) The compressed archive 18 is divided into compression blocks, such as compression blocks 28 and 30. (Compression blocks are delineated by solid unbolded lines in FIG. 1.)

As is seen in the illustration of the compressed archive 18, the compression blocks (such as blocks 28 and 30) do not necessarily align with file boundaries or with archive blocks (such as blocks 20' and 22', the compressed equivalent of archive blocks 20 and 22).

2. Error Recovery with Compressed Archived Files

Compressed archived files are useful for downloading data files for several reasons. First, it is simpler and more convenient for a user or a software program to request a single archive file than it is to request several different files for download. Second, downloading an archive—even if it is not compressed—can be faster than downloading individual files because it is not necessary to reestablish a new connection between computers for each different file. Third, compression of the data files means that fewer bytes of data need to be transmitted over the connection, resulting a faster download time. Finally, the archiving of the data files before compression often results in more effective compression and—as a result—still shorter download times.

Nevertheless, there are disadvantages to the use of compressed archived files for data transfer. Compressed archives may be rather large. As a result, a compressed archive can be difficult to manage if there is an interruption, such as an error or a disconnection during download. One known way of resuming the download is to request the entire file again in the hope that the second download attempt will not fail. Of course, this route is particularly inefficient. A more effective alternative is to save the compressed archive as it is downloaded. If the download is interrupted, the downloading computer can request that the download resume at or before the point of failure. The "range retrieval request" feature of HTTP 1.1, as described in section 14.36.2 of RFC 2068 (January 1997), allows a computer to request a download starting at a position within a file. Although this technique is more efficient because the file is not downloaded twice, the sequential access nature of compressed data requires the downloading computer to store large amounts of archived data in a local data storage before decompression. This technique can be ineffective if there is limited storage space on the downloading computer.

SUMMARY

A system and method are provided for storing and using recovery state information during a data stream transfer. During a transfer of compressed, archived data, the system tracks the position of the last-received file boundary and the position of the last compression block boundary before the last file boundary, and the system stores this information as a recovery state. If the transfer is interrupted, the system uses the recovery state information to resume the transfer at an efficient location in the data stream.

To recover from an interrupted download, the system requests the transfer to resume starting with the position of the last compression block boundary before the last file boundary. Once the transfer resumes, the system locates the last-received file boundary. Until the file boundary is reached, it is not necessary to store compressed or decompressed data or to de-archive the data. The system can efficiently resume the transfer by decompressing, de-archiving, and storing data after the last file boundary is reached.

DETAILED DESCRIPTION

I. Overview

In one embodiment of the invention, a client downloads a compressed archive from a server. An examining agent at the client monitors the download as it is decompressed and de-archived at the client. As the download progresses, the examining agent determines recovery state information, so that if the download is interrupted, the client can use the recovery state information to resume the download efficiently.

In particular, the recovery state information determined by the examining agent is the position of the last file boundary in the decompressed archive and the position of the last compression block boundary before that last file boundary. (It should be noted that the term "last" as used herein refers to the last boundaries to have been received, which may or may not be the last boundaries in the entire compressed archive.) The position of that stored compression block boundary is the compression block boundary position in the compressed archive and the compression block boundary position in the decompressed archive. The determination of recovery state information is described in further detail in section II.A, below.

If a download is interrupted, the client can resume the download with the assistance of the recovery state information. To resume an interrupted download, the client requests that the server resume sending the compressed archive starting with the position that corresponds to the compression block boundary. As the server sends the compressed archive, the client decompresses the archive and, using the recovery state information, locates the position of the file boundary in the decompressed archive. The client can then resume de-archiving at the start of the file. Download recovery is described in further detail in section II.B, below.

Using this technique of resuming a download can provide one or more of several benefits. First, the download of the compressed archive need not be resumed from the beginning. Second, even though the download is not resumed from the beginning, the portion of the compressed archive that had been successfully downloaded need not be stored by the client. Third, the client need not de-archive the data between the compression block boundary and the file boundary. If the server does not permit a download to be resumed in the middle of the file and resends the compressed archive from the beginning, the technique poses the added benefit that the client need not decompress the data until it reaches the position that corresponds to the stored compression block boundary.

II. Recovery Method

A. Updating the Recovery State

Figure 1:
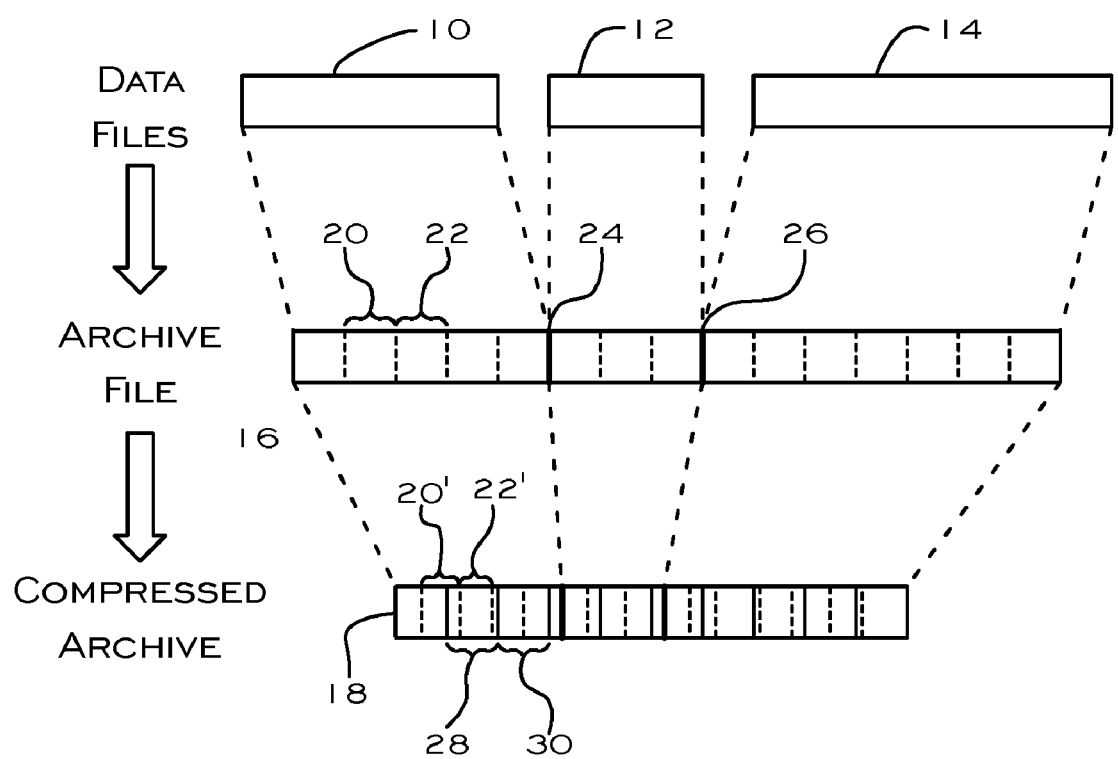
FIG. 1 illustrates the structure of a conventional compressed archive file.
Figure 2:
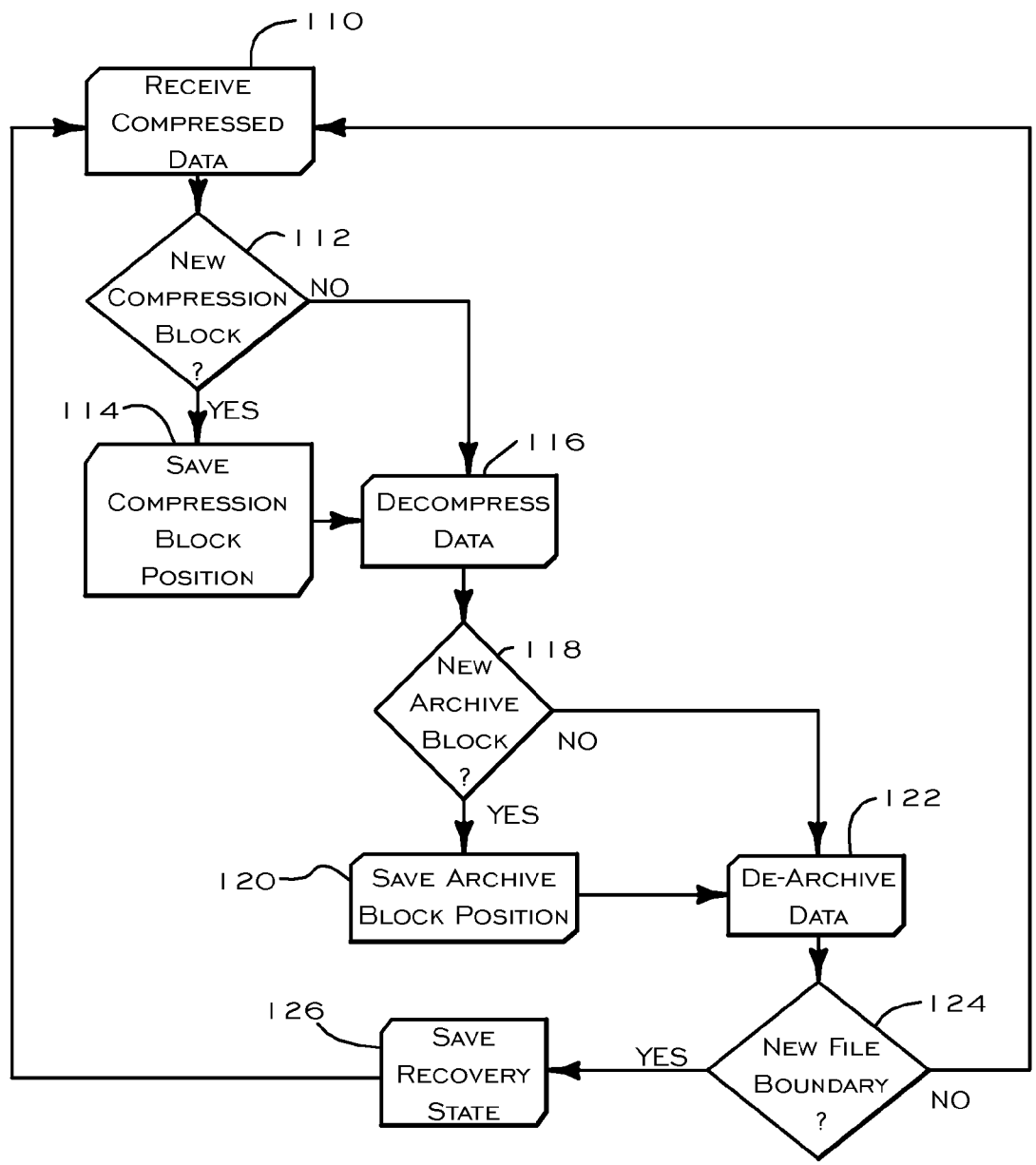
FIG. 2 is a schematic flow diagram of a method for determining a recovery state.

One example of a method for determining a recovery state is illustrated in FIG. 2. In this method, a client receives a compressed archive in a data stream. The client maintains current state information that identifies the position of the last compression block boundary and the last archive block boundary to be reached in the stream. The client also maintains recovery state information. Whenever the client reaches a new compression block boundary, it saves the position of the compression block boundary in the current state information. Likewise, whenever the client reaches a new archive block boundary, it saves the position of the archive block boundary in the current state information. If the client reaches a file boundary, it saves the current state information as the recovery state. In that way, if the data stream is interrupted, the client can efficiently resume reading the data stream from the positions stored in the recovery state.

In FIG. 2, the client receives a compressed archive as a data stream at step 110, and the client checks at step 112 to determine whether a compression block has been reached. If a compression block boundary has been reached, the client saves the position of the compression block boundary at step 114. Preferably, the client saves the position as an offset from the beginning of the compressed data stream and as an offset from the beginning of the decompressed data stream.

Whether or not a compression block boundary was reached, the client decompresses the data stream at step 116 to create a decompressed data stream. The client then checks the decompressed data at step 118 to determine whether a new archive block boundary has been reached. If a new archive block boundary has been reached, the client saves the position of the archive block boundary in the current state information at step 120. The client preferably saves the position of the archive block boundary as an offset from the beginning of the decompressed data stream. The position of the archive block boundary may alternatively be stored in another format, such as an offset from the compression block boundary in the decompressed data stream.

In de-archiving the data (step 122), the client determines in step 124 whether the saved archive block boundary corresponds to a file boundary (i.e., whether a new file begins in the new archive block). If so, the client saves the current state information as the recovery state information in step 126. The client then receives and processes additional data in the compressed data stream in step 110.

It should be noted that the operations performed in FIG. 2 may be implemented as operations performed on data streams. As such, the steps illustrated in FIG. 2 may be performed at varying times or even simultaneously with one another, rather than in a stepwise sequence.

The operations performed by the client in one embodiment can be summarized as follows. The client looks for three conditions in the data stream: (1) a new compression block boundary is found; (2) a new archive block is found; and (3) a new file boundary is found. If these three conditions are all met, the client saves, or "persists," the following data: (A) the position—with respect to the compressed data stream—of the last compression block boundary; (B) the position—with respect to the uncompressed data stream—of the last compression block boundary; and (C) the position—with respect to the uncompressed data stream—of the file boundary.

B. Recovering from a Failed Download

If a download is successful on the first attempt, the entire compressed archive can be compressed and de-archived without ever making use of the stored recovery state information. If, however, the download is interrupted, the client can make use of the stored recovery state information to resume the download at an advantageous position.

Figure 3:
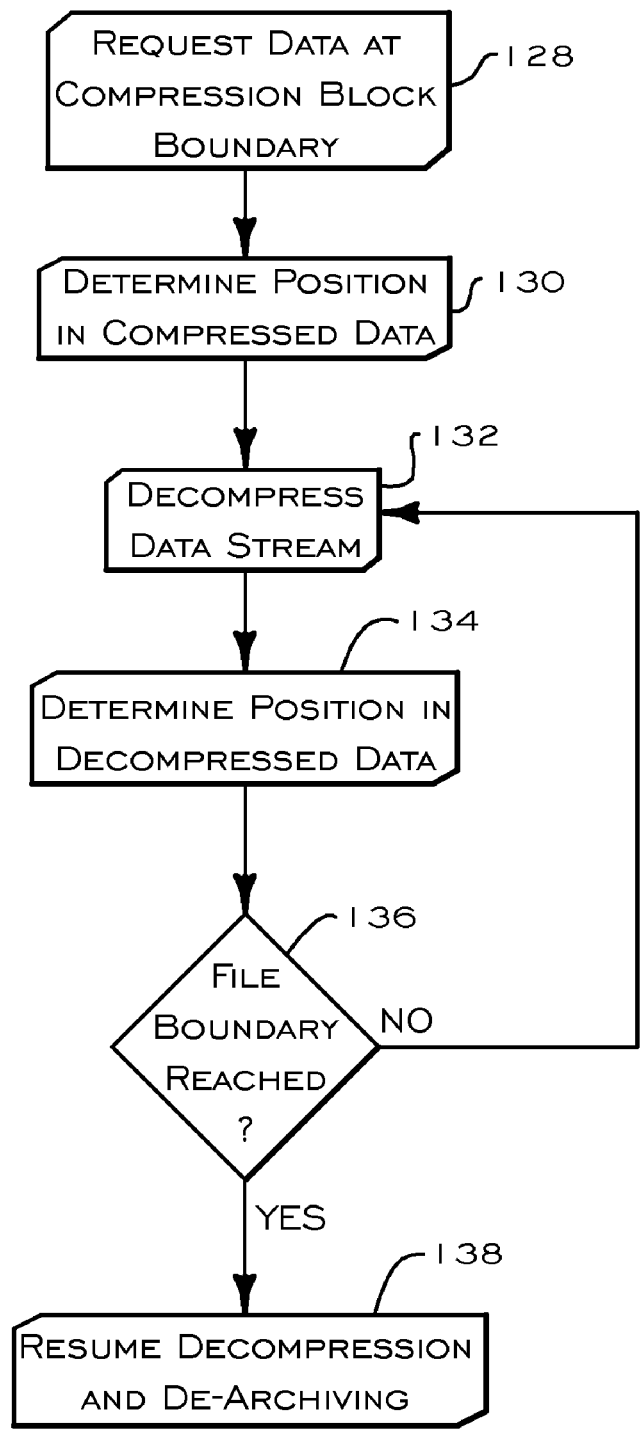
FIG. 3 is a schematic flow diagram of a method for resuming an interrupted download.

A method of resuming an interrupted download using a stored recovery state is illustrated in FIG. 3. In this embodiment, the stored recovery state includes the position of the last compression block boundary (determined both with respect to the compressed data stream and the decompressed data stream) and the position of the last file boundary (determined with respect to the decompressed data stream).

At step 128, the client requests the server to resume sending the compressed archive starting with the position (with respect to the compressed data stream) of the stored compression block boundary. This request may be made, for example, using an HTTP range retrieval request. In response to the request, the server resumes sending the compressed archive starting with the stored compression block boundary.

Once the download has resumed, the client advances through the data to reach the stored file boundary. In one embodiment, the client locates the stored file boundary as follows. The client takes as its starting point the stored position (with respect to the decompressed data stream) of the compression block boundary (step 130). The client then advances through the compressed data and decompresses the data stream (step 132) to determine the current position in the decompressed data stream (step 134). At step 136, the client compares its current position in the decompressed data stream with the stored position of the file boundary to determine whether the file boundary has been reached.

If the file boundary has not yet been reached, the system continues to advance through the data and to determine its position in the decompressed data until the file boundary is reached. Once the file boundary has been reached, the client may begin decompressing and de-archiving the compressed archive from the beginning of the file boundary (step 138).

Figure 4:
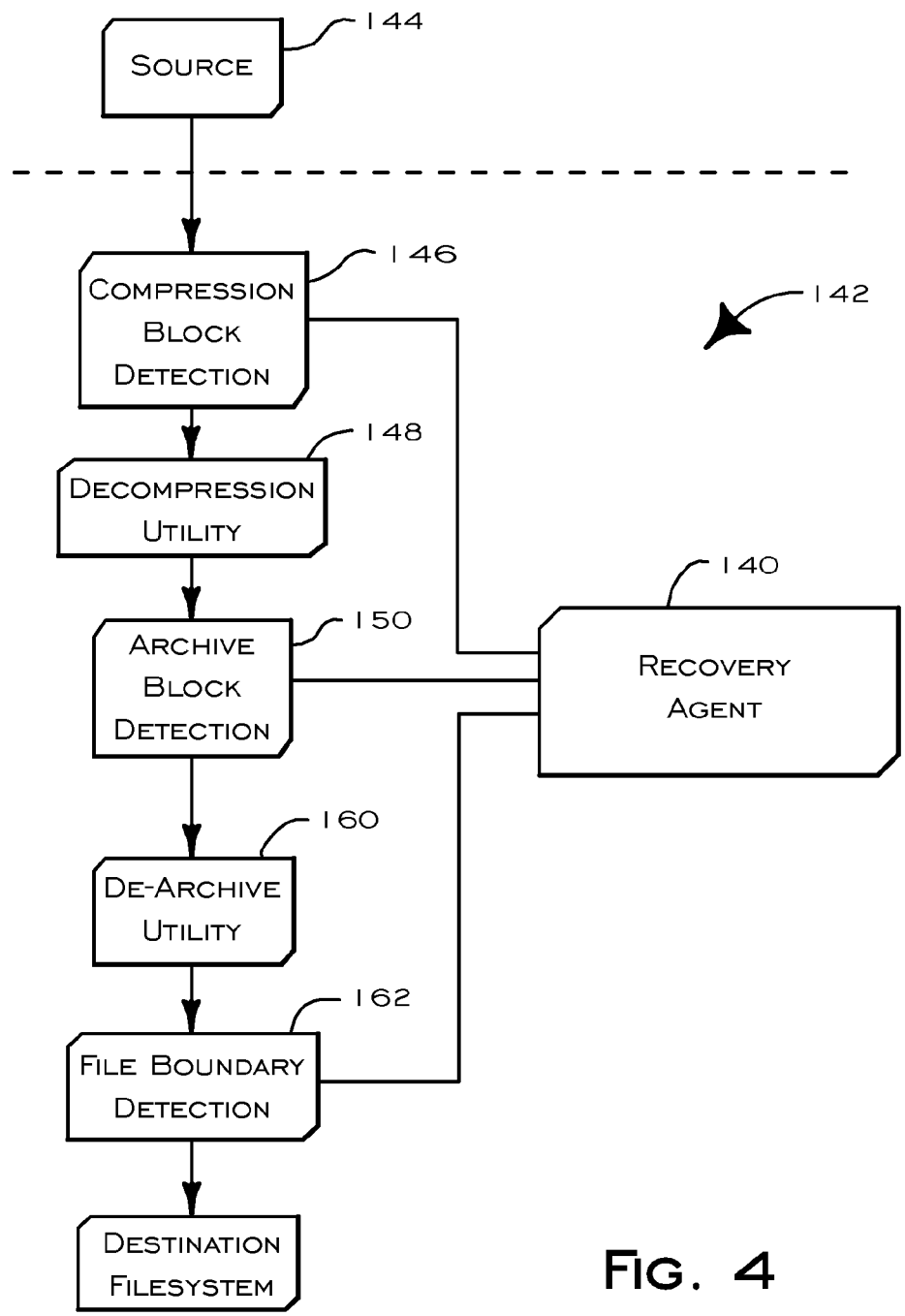
FIG. 4 is a schematic block diagram of a system for determining a recovery state.

By implementing the method of FIG. 3, the client can advance to the beginning of the stored file boundary without needing to store decompressed data and without needing to de-archive any data before the file boundary is reached. The data decompressed in step 132 may be discarded, rather than being de-archived or written to a local storage device (such as a flash filesystem or a hard drive) in the client III. Recovery System A system for implementing the methods described in section II is illustrated in FIG. 4. A client 142 is provided with a recovery agent 140 that manages the determination of the recovery state. The client 142 receives a stream of compressed archive data from a source 144, such as a server computer. The client includes a compression block detection module 146 that determines when a new compression block has begun in the data stream. The position of the new compression block is communicated to the recovery agent 140.

A decompression utility 148 decompresses the data, and an archive block detection module 150 determines whether the beginning of a new archive block has been reached. If so, that module communicates the position of the archive block boundary to the recovery agent. A de-archive utility 160 de-archives the decompressed data, and a file boundary detection module determines whether a new file boundary has been reached. If so, that module communicates that fact to the recovery agent, and, in response, the recovery agent persists the positions of the recovery block boundary and the file boundary as the recovery state.

IV. Alternative Embodiments

The terms "client," "server," and "download" have been used herein to describe various embodiments of the invention. These terms should not be construed in an unduly limiting manner. For example, while a "client" could be a home computer or other consumer electronics device, such as a digital video recorder, digital camera, or personal digital assistant (PDA), the term is not necessarily limited to such devices. Moreover, while the term "server" could apply to a centralized computer from which data is retrieved by a multitude of clients, it is not limited to such a computer. Likewise, the term "download" could apply to a transfer of data from a larger, central, or institutional computer to a smaller, peripheral, or personal computer, but the term as used herein is not so limited. Rather, the terms used herein should be construed with the understanding that the system and method described can be applied to the transfer of data between any two electronic devices, including, for example, a peer-to-peer data transfer.

The invention claimed is:

1. A method of determining a recovery state in a data stream, comprising:

receiving a compressed data stream;

detecting a compression block boundary in the compressed data stream;

detecting an archive block boundary in the compressed data stream;

detecting a file boundary in the compressed data stream; and in response to the detection of the compression block boundary, the archive block boundary, and the file boundary, saving a recovery state for the compressed data stream;

wherein the recovery state includes a position of the compression block boundary, and a position of the file boundary.

2. The method of claim 1, further comprising decompressing the compressed data stream to form a decompressed data stream.

3. The method of claim 2, wherein the position of the compression block boundary includes the position of the compression block boundary in the compressed data stream and the position of the compression block boundary in the decompressed data stream.

4. The method of claim 3, wherein the position of the compression block boundary in the compressed data stream is an offset from the beginning of the compressed data stream; and wherein the position of the compression block boundary in the decompressed data stream is an offset from the beginning of the decompressed data stream.

5. The method of claim 2, wherein the position of the file boundary includes the position of the file boundary in the decompressed data stream.

6. The method of claim 1, wherein the position of the file boundary is a position of an archive block boundary of an archive block in which the file boundary is detected.

7. The method of claim 1, wherein the recovery state includes:

the position of the last-detected file boundary; and the position of the last compression block boundary before the last file block boundary.

8. The method of claim 2, wherein the recovery state includes:

an offset of the last-detected file block boundary in the decompressed data stream;

an offset of the last compression block boundary before the last file boundary in the compressed data stream; and an offset of the last compression block boundary before the last file boundary in the decompressed data stream.

9. A method of determining a recovery, state in a data stream, comprising:

receiving a compressed data stream, wherein the compressed data stream includes one or more compression block boundaries and one or more file boundaries;

detecting a file boundary; and in response to detecting The file boundary, storing the position of the detected file boundary and the position of The last compression block boundary before the detected file boundary.

10. The method of claim 9, further comprising decompressing the compressed data stream to form a decompressed data stream.

11. The method of claim 10, wherein the position of the last compression block boundary includes the position of the last compression block boundary in the compressed data stream and the position of The last compression block boundary in the decompressed data stream.

12. The method of claim 10, wherein the position of the last compression block boundary in the compressed data stream is an offset from the beginning of the compressed data stream; and wherein the position of the last compression block boundary in the decompressed data stream is an offset from the beginning of the decompressed data stream.

13. The method of claim 10, wherein the position of the file boundary includes the position of the file boundary in the decompressed data stream.

14. The method of claim 9, wherein the position of the file boundary is the position of the boundary of an archive block in which the file boundary is detected.

* * * * *